(12) United States Patent
Yamada

(10) Patent No.: US 7,158,691 B2
(45) Date of Patent: Jan. 2, 2007

(54) IMAGE EVALUATING METHOD AND APPARATUS

(75) Inventor: Masahiko Yamada, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 810 days.

(21) Appl. No.: 10/285,492

(22) Filed: Nov. 1, 2002

(65) Prior Publication Data

US 2003/0086626 A1 May 8, 2003

(30) Foreign Application Priority Data

Nov. 2, 2001 (JP) ............................. 2001-337418

(51) Int. Cl.
*G06K 9/36* (2006.01)
(52) U.S. Cl. ........................................ 382/291; 600/407
(58) Field of Classification Search ................ 382/278, 382/291, 295, 128–134; 600/407; 73/1.86; 378/18, 207
See application file for complete search history.

(56) References Cited

U.S. PATENT DOCUMENTS

| 4,331,021 A | * | 5/1982 | Lopez et al. ................. 73/1.86 |
| 5,526,442 A | * | 6/1996 | Baba et al. .................. 382/132 |
| 5,910,975 A | * | 6/1999 | Floyd et al. ................. 378/207 |
| 6,674,834 B1 | * | 1/2004 | Acharya et al. .............. 378/18 |
| 6,694,047 B1 | * | 2/2004 | Farrokhnia et al. ......... 382/132 |

* cited by examiner

*Primary Examiner*—Kanjibhai Patel
(74) *Attorney, Agent, or Firm*—Sughrue Mion, PLLC

(57) ABSTRACT

An input of an evaluation object image signal representing an evaluation object image with respect to a pattern composed of a plurality of evaluating regions, in each of which at least one signal area is located at a predetermined position, is accepted. The evaluating regions have been set such that a size and contrast of the signal area vary by stages for different evaluating regions. The positions of the signal areas, which are located in all of the evaluating regions in the evaluation object image, are detected in accordance with a reference image signal, which represents a reference image with respect to the pattern, and the evaluation object image signal. The evaluation object image is evaluated in accordance with the results of the detection of the positions of the signal areas.

32 Claims, 14 Drawing Sheets

EVALUATION OBJECT IMAGE

REFERENCE IMAGE

EVALUATION OBJECT IMAGE

REFERENCE IMAGE

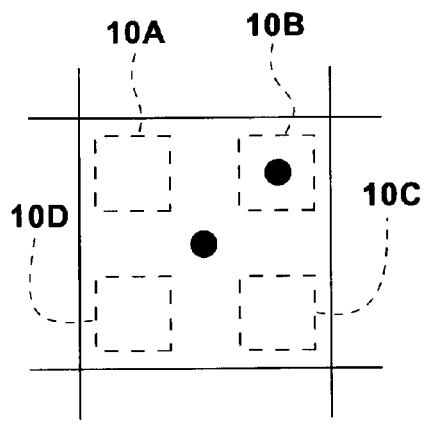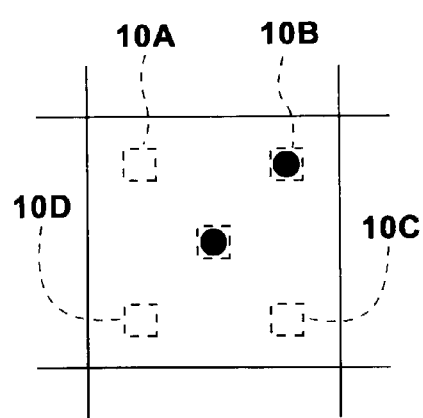

FIG.9

| | 0.3 | 0.4 | 0.5 | 0.6 | 0.8 | 1.0 | 1.3 | 1.6 | 2.0 | 2.5 | 3.2 | 4.0 | 5.0 | 6.3 | 8.0 |
|---|---|---|---|---|---|---|---|---|---|---|---|---|---|---|---|
| 8.0 | 0 | 0 | 0 | 0 | 0 | 0 | 0 | 0 | 0 | 0 | 0 | 0 | 0 | 0 | 0 |
| 6.3 | 0 | 0 | 0 | 0 | 0 | 0 | 0 | 0 | 0 | 0 | 0 | 0 | 0 | 0 | 0 |
| 5.0 | 0 | 0 | 0 | 0 | 0 | 0 | 0 | 0 | 0 | 0 | 0 | 0 | 0 | 0 | 0 |
| 4.0 | 9 | 3 | 9 | 0 | 1 | 3 | 1 | 3 | 1 | 1 | 0 | 0 | 3 | 2 | 1 |
| 3.2 | 9 | 1 | 9 | 1 | 2 | 3 | 0 | 0 | 1 | 2 | 1 | 1 | 2 | 0 | 3 |
| 2.5 | 9 | 9 | 1 | 2 | 3 | 3 | 0 | 3 | 3 | 0 | 1 | 0 | 0 | 2 | 2 |
| 2.0 | 2 | 3 | 0 | 3 | 2 | 0 | 2 | 1 | 2 | 2 | 0 | 0 | 1 | 0 | 2 |
| 1.6 | 9 | 1 | 2 | 0 | 0 | 3 | 1 | 3 | 1 | 2 | 1 | 3 | 2 | 3 | 1 |
| 1.3 | 9 | 9 | 1 | 0 | 0 | 1 | 1 | 0 | 2 | 1 | 2 | 3 | 1 | 0 | 0 |
| 1.0 | 3 | 9 | 0 | 0 | 9 | 2 | 1 | 3 | 1 | 1 | 2 | 3 | 3 | 1 | 2 |
| 0.8 | 9 | 9 | 3 | 0 | 3 | 0 | 9 | 3 | 1 | 1 | 2 | 2 | 3 | 1 | 2 |
| 0.6 | 0 | 1 | 2 | 0 | 0 | 1 | 1 | 3 | 1 | 3 | 1 | 0 | 1 | 0 | 1 |
| 0.5 | 2 | 9 | 2 | 1 | 1 | 9 | 2 | 9 | 1 | 3 | 1 | 2 | 3 | 2 | 1 |
| 0.4 | 1 | 9 | 3 | 2 | 9 | 2 | 0 | 3 | 3 | 2 | 3 | 1 | 0 | 0 | 3 |
| 0.3 | 0 | 9 | 3 | 1 | 2 | 3 | 2 | 3 | 1 | 2 | 3 | 3 | 0 | 1 | 0 |

HOLE DIAMETER (MM)

HOLE DEPTH (MM)

FIG.10

| HOLE DIAMETER (MM) | | | | | | | | | | | | | | | |
|---|---|---|---|---|---|---|---|---|---|---|---|---|---|---|---|
| 8.0 | 0 | 0 | 0 | 0 | 0 | 0 | 0 | 0 | 0 | 0 | 0 | 0 | 0 | 0 | |
| 6.3 | 0 | 0 | 0 | 0 | 0 | 0 | 0 | 0 | 0 | 0 | 0 | 0 | 0 | 0 | |
| 5.0 | 0 | 0 | 0 | 0 | 0 | 0 | 0 | 0 | 0 | 0 | 0 | 0 | 0 | 0 | |
| 4.0 | 2 | 3 | 1 | 0 | 1 | 3 | 1 | 3 | 1 | 1 | 0 | 0 | 3 | 2 | 1 |
| 3.2 | 0 | 1 | 3 | 1 | 2 | 3 | 0 | 0 | 1 | 2 | 1 | 1 | 2 | 0 | 3 |
| 2.5 | 3 | 0 | 1 | 2 | 3 | 3 | 0 | 3 | 3 | 0 | 1 | 0 | 0 | 2 | 2 |
| 2.0 | 2 | 3 | 0 | 3 | 2 | 0 | 2 | 1 | 2 | 2 | 0 | 0 | 1 | 0 | 2 |
| 1.6 | 2 | 1 | 2 | 0 | 0 | 3 | 1 | 3 | 1 | 2 | 1 | 3 | 2 | 3 | 1 |
| 1.3 | 0 | 1 | 1 | 0 | 0 | 1 | 1 | 0 | 2 | 1 | 2 | 3 | 1 | 0 | 0 |
| 1.0 | 0 | 1 | 0 | 3 | 1 | 2 | 1 | 3 | 1 | 1 | 2 | 3 | 3 | 1 | 2 |
| 0.8 | 2 | 1 | 2 | 3 | 3 | 2 | 3 | 3 | 1 | 1 | 2 | 2 | 3 | 1 | 2 |
| 0.6 | 0 | 3 | 3 | 0 | 2 | 1 | 1 | 3 | 1 | 3 | 1 | 0 | 1 | 0 | 1 |
| 0.5 | 2 | 2 | 1 | 3 | 3 | 1 | 0 | 0 | 1 | 3 | 1 | 2 | 3 | 2 | 1 |
| 0.4 | 0 | 2 | 0 | 0 | 1 | 3 | 0 | 3 | 3 | 2 | 3 | 1 | 0 | 0 | 3 |
| 0.3 | 1 | 0 | 2 | 1 | 3 | 3 | 1 | 1 | 2 | 2 | 1 | 3 | 0 | 1 | 0 |
| | 0.3 | 0.4 | 0.5 | 0.6 | 0.8 | 1.0 | 1.3 | 1.6 | 2.0 | 2.5 | 3.2 | 4.0 | 5.0 | 6.3 | 8.0 |

HOLE DEPTH (MM)

| HOLE DIAMETER (MM) \ HOLE DEPTH (MM) | 0.3 | 0.4 | 0.5 | 0.6 | 0.8 | 1.0 | 1.3 | 1.6 | 2.0 | 2.5 | 3.2 | 4.0 | 5.0 | 6.3 | 8.0 |
|---|---|---|---|---|---|---|---|---|---|---|---|---|---|---|---|
| 8.0 | T | T | T | T | T | T | T | T | T | T | T | T | T | T | T |
| 6.3 | T | T | T | T | T | T | T | T | T | T | T | T | T | T | T |
| 5.0 | T | T | T | T | T | T | T | T | T | T | T | T | T | T | T |
| 4.0 | F | T | F | T | T | T | T | T | T | T | T | T | T | T | T |
| 3.2 | F | T | F | T | T | T | T | T | T | T | T | T | T | T | T |
| 2.5 | F | F | T | T | T | T | T | T | T | T | T | T | T | T | T |
| 2.0 | T | T | T | T | T | T | T | T | T | T | T | T | T | T | T |
| 1.6 | F | T | T | T | T | T | T | T | T | T | T | T | T | T | T |
| 1.3 | F | F | T | T | T | T | T | T | T | T | T | T | T | T | T |
| 1.0 | F | F | T | F | F | T | T | T | T | T | T | T | T | T | T |
| 0.8 | F | F | F | F | F | T | F | T | T | T | T | T | T | T | T |
| 0.6 | T | F | F | T | F | T | T | T | T | T | T | T | T | T | T |
| 0.5 | T | F | F | F | F | F | F | F | T | T | T | T | T | T | T |
| 0.4 | F | F | F | F | F | F | T | T | T | T | T | T | T | T | T |
| 0.3 | F | F | F | T | F | T | F | F | F | T | F | T | T | T | T |

Ttf (right side bracket on row 2.0)

FIG.12

| HOLE DIAMETER (MM) \ HOLE DEPTH (MM) | 0.3 | 0.4 | 0.5 | 0.6 | 0.8 | 1.0 | 1.3 | 1.6 | 2.0 | 2.5 | 3.2 | 4.0 | 5.0 | 6.3 | 8.0 |
|---|---|---|---|---|---|---|---|---|---|---|---|---|---|---|---|
| 8.0 | T | T | T | T | T | T | T | T | T | T | T | T | T | T | T |
| 6.3 | T | T | T | T | T | T | T | T | T | T | T | T | T | T | T |
| 5.0 | T | T | T | T | T | T | T | T | T | T | T | T | T | T | T |
| 4.0 | F | F | F | T | T | T | T | T | T | T | T | T | T | T | T |
| 3.2 | F | F | T | T | T | T | T | T | T | T | T | T | T | T | T |
| 2.5 | F | T | T | T | T | T | T | T | T | T | T | T | T | T | T |
| 2.0 | F | T | T | T | T | T | T | T | T | T | T | T | T | T | T |
| 1.6 | F | T | T | T | T | T | T | T | T | T | T | T | T | T | T |
| 1.3 | F | F | T | T | T | T | T | T | T | T | T | T | T | T | T |
| 1.0 | F | F | F | F | T | T | T | T | T | T | T | T | T | T | T |
| 0.8 | F | F | F | F | F | T | T | T | T | T | T | T | T | T | T |
| 0.6 | F | F | F | F | T | F | T | T | T | T | T | T | T | T | T |
| 0.5 | F | F | F | F | F | F | F | T | T | T | T | T | T | T | T |
| 0.4 | F | F | F | F | F | F | F | T | T | T | T | T | T | T | T |
| 0.3 | F | F | F | F | F | F | F | F | F | F | T | T | T | T | T |

HOLE DEPTH (MM)

IMAGE EVALUATING METHOD AND APPARATUS

BACKGROUND OF THE INVENTION

1. Field of the Invention

This invention relates to an image evaluating method and apparatus, wherein an image, which has been obtained from an image recording apparatus, an image processing unit, or the like, is evaluated. This invention also relates to a computer program for causing a computer to execute the image evaluating method, and a computer readable recording medium, on which the computer program has been recorded.

2. Description of the Related Art

It is one of important subjects for image processing algorithm developers how to evaluate effects of image processing during activities for developing new image processing algorithms for image processing, such as enhancement processing in a frequency domain, smoothing processing, or noise removal processing.

As an index for representing image quality, a detective quantum efficiency value (DQE value) has heretofore been utilized. The DQE value is the value representing the image quality and is calculated with the formula shown below. A large DQE value indicates enhanced image quality.

$$DQE(u) = \{(\log_{10} e)^2 \times \gamma^2 \times MTF^2(u)\} / \{q \times WS(u)\}$$

wherein MTF represents the modulation transfer function, which is obtained by recording the image of the contrast transfer function chart (CTF chart) and is the index for representing the level of resolution, i.e. the sharpness, of the image signal of each of frequency bands, WS(u) represents the Wiener spectrum and is the index for representing the graininess, u represents the frequency, γ represents the gamma value representing the gradation characteristics of the film utilized for obtaining the image, and q represents the quantum number.

In the cases of linear image processing, the sharpness and the graininess are improved in the same manner, and therefore the DQE value itself does not vary. In the cases of nonlinear image processing, the sharpness and the graininess are capable of being processed as the two independent processes, and therefore the DQE value is capable of being improved markedly, depending upon whether the image processing with respect to the sharpness or the image processing with respect to the graininess is or is not performed.

As one of typical techniques for evaluating image quality of images in the fields of radiation images, a visual evaluating technique utilizing a Burger phantom has heretofore been known. The Burger phantom comprises a plurality of arrayed circular cylinder-shaped acrylic bodies, whose diameters and thicknesses vary by stages. In cases where an image obtained from an imaging operation performed on the Burger phantom by use of an imaging system is seen, both the spatial resolution and the contrast resolution of the image obtained with the imaging system are capable of being evaluated. The diameter of each of the circular cylinder-shaped acrylic bodies acts as the index for the evaluation of the spatial resolution. Also, the thickness of each of the circular cylinder-shaped acrylic bodies acts as the index for the evaluation of the contrast resolution. In cases where the image of the Burger phantom is obtained with an imaging system, which is capable of yielding an image having good image quality, an image pattern of a circular cylinder-shaped acrylic body, which has a small diameter and a small thickness, is capable of being perceived in the image of the Burger phantom. Therefore, the image of the Burger phantom may be obtained with an imaging system, for which the image evaluation is to be performed, and the limit of perceptibility of an image pattern, which corresponds to a circular cylinder-shaped acrylic body, in the image of the Burger phantom may be recognized. In this manner, the evaluation of the image obtained with the imaging system is capable of being performed.

However, the Burger phantom comprises the circular cylinder-shaped acrylic bodies, which are located at predetermined positions. Therefore, the person, who sees the image of the Burger phantom, recognizes previously that the image patterns of the circular cylinder-shaped acrylic bodies will be present at the positions in the image, which positions correspond to the predetermined positions of the circular cylinder-shaped acrylic bodies in the Burger phantom. Accordingly, psychological effects occur with the person, who sees the image of the Burger phantom, in that an image pattern of a circular cylinder-shaped acrylic body, which image pattern is actually invisible, seems to be visible. The problems thus occur in that the results of the image evaluation are adversely affected by the psychological effects occurring with the person, who sees the image of the Burger phantom.

Therefore, in lieu of the Burger phantom, a CDRAD phantom (i.e., a contrast detail digital/conventional radiography phantom, supplied by Northwest X-ray Inc.) is recently utilized for the image evaluation.

The CDRAD phantom is constituted of an acrylic plate, which is divided into 15×15 regions arrayed in a lattice-like pattern. One or two holes are formed within each of the lattice regions. The diameters and the depths of the holes vary by stages for different lattice regions. Specifically, the holes within the lattice regions are formed such that the diameters of the holes vary by stages in the vertical direction of the array of the lattice regions, and such that the depths of the holes vary by stages in the horizontal direction of the array of the lattice regions. Also, as for the lattice regions, which are located along the top row, the second top row, and third top row in the array of the lattice regions, one hole is formed within each of the lattice regions. As for the lattice regions, which are located along the other rows in the array of the lattice regions, two holes are formed within each of the lattice regions. More specifically, in each of the lattice regions, which are located along the other rows in the array of the lattice regions, a first hole having a certain diameter and a certain depth is formed at a center area of the lattice region, and a second hole having a diameter identical with the diameter of the first hole and a depth identical with the depth of the first hole is formed at one of four corner areas of the lattice region. When the image evaluation with the CDRAD phantom is to be performed with respect to an imaging system, a radiation image of the CDRAD phantom is acquired with the imaging system, and a CDRAD phantom image is thereby obtained. Evaluation of the CDRAD phantom image is then performed. In this manner, evaluation of images obtained with the imaging system, with which the radiation image of the CDRAD phantom has been acquired, is capable of being performed. Further, in cases where image processing is performed on the CDRAD phantom image by use of an image processing system, and a processed CDRAD phantom image is thereby obtained, evaluation of images obtained with the image processing system is capable of being performed. How the image evaluation with the CDRAD phantom is performed will be described hereinbelow.

FIG. 2 is an explanatory view showing an example of a radiation image of a CDRAD phantom (hereinbelow referred to as the CDRAD phantom image). The holes within the lattice regions constituting the CDRAD phantom are formed such that the diameter of each of the holes becomes small toward the bottom row in the array of the lattice regions, and such that the depth of each of the holes becomes small toward the left-hand end column in the array of the lattice regions. Therefore, as illustrated in FIG. 2, as the location of the lattice region becomes close to the lower left-hand corner of the CDRAD phantom, the image pattern of the hole formed within the lattice region becomes hard to see. In the CDRAD phantom image illustrated in FIG. 2, the numerals indicated on the left-hand side of the lattice regions represent the diameters of the holes. Also, the numerals indicated on the bottom side of the lattice regions represent the depths of the holes.

Firstly, with respect to each of the top row, the second top row, and third top row in the array of the lattice regions, the person, who sees the CDRAD phantom image, indicates the limit of visibility of the hole image patterns. Also, with respect to each of the lattice regions, which are located along the other 12 lower rows in the array of the lattice regions, the person, who sees the CDRAD phantom image, indicates the position of the image pattern of the hole, which is formed at one of the four corner areas of the lattice region. Specifically, the person, who sees the CDRAD phantom image, indicates that the image pattern of the hole is located at the upper right-hand corner area, at the lower right-hand corner area, at the upper left-hand corner area, or at the lower left-hand corner area.

After the indication has been made by the person, who sees the CDRAD phantom image, comparisons between the results of the indication and the true positions are made with respect to all lattice regions (15×15=225 lattice regions). In this manner, trueness-falseness results are obtained with respect to each of the lattice regions.

It may occur with a probability of ¼ that the result of the indication coincides by accident with the true position. In order for the problems to be eliminated, the trueness-falseness results are corrected in accordance with the rules described under (1) to (4) below.

(1) In cases where the result of the indication having been made with respect to a lattice region (hereinbelow referred to as the lattice region of interest), for which the judgment as to the trueness or falseness of the result of the indication is to be made, has been found to coincide with the true position, if the results of the indications having been made with respect to at least two lattice regions, which are among the four (i.e., upper, lower, right-hand, and left-hand) nearest neighbor lattice regions, are found to coincide with the true positions, it should be regarded that the result of the indication having been made with respect to the lattice region of interest coincides with the true position. In cases where a lattice region, which is in contact with a side of the CDRAD phantom image, is taken as the lattice region of interest, if the results of the indications having been made with respect to at least two lattice regions, which are among the three nearest neighbor lattice regions, are found to coincide with the true positions, it should be regarded that the result of the indication having been made with respect to the lattice region of interest coincides with the true position.

(2) In cases where only two nearest neighbor lattice regions exist, i.e. in cases where a lattice region located at one of the four corner areas of the CDRAD phantom image is taken as the lattice region of interest, and the result of the indication having been made with respect to the lattice region of interest has been found to coincide with the true position, if the result of the indication having been made with respect to one of the two nearest neighbor lattice regions is found to coincide with the true position, it should be regarded that the result of the indication having been made with respect to the lattice region of interest coincides with the true position.

(3) In cases where the result of the indication having been made with respect to the lattice region of interest has been found not to coincide with the true position, if the results of the indications having been made with respect to at least three lattice regions, which are among the four nearest neighbor lattice regions, are found to coincide with the true positions, it should be regarded that the result of the indication having been made with respect to the lattice region of interest coincides with the true position. In cases where a lattice region, which is in contact with a side of the CDRAD phantom image, is taken as the lattice region of interest, and the result of the indication having been made with respect to the lattice region of interest has been found not to coincide with the true position, if the results of the indications having been made with respect to all of the three nearest neighbor lattice regions are found to coincide with the true positions, it should be regarded that the result of the indication having been made with respect to the lattice region of interest coincides with the true position.

(4) In cases where a lattice region located at one of the four corner areas of the CDRAD phantom image is taken as the lattice region of interest, and the result of the indication having been made with respect to the lattice region of interest has been found not to coincide with the true position, if the results of the indications having been made with respect to both the two nearest neighbor lattice regions are found to coincide with the true positions, it should be regarded that the result of the indication having been made with respect to the lattice region of interest coincides with the true position.

Also, reference is made to the corrected trueness-falseness results, and the limit values of the diameters and the depths of the visually perceptible holes are plotted on a logarithmic graph, in which the logarithmic values of the hole depths are plotted on the horizontal axis, and the logarithmic values of the hole diameters are plotted on the vertical axis. In this manner, a CD curve is obtained, where C represents the contrast, and D represents the detail. With the CD curve, it is capable of being found that, in cases where an image pattern of a hole, which has a small diameter and a small depth, is visually perceptible in the CDRAD phantom image, the imaging system which yielded the CDRAD phantom image may be regarded as having good performance.

As illustrated in FIG. 2, in the cases of the image evaluation utilizing the CDRAD phantom, the position of the hole, which is located at one of the four corner areas of each of the lattice regions, is not known previously. Therefore, the results of the image evaluation are not apt to be affected by subjectivity of the person, who sees the CDRAD phantom image. As a result, more objective evaluation results are capable of being obtained than with the image evaluation utilizing the Burger phantom.

As described above, the technique for performing the image evaluation by use of the CDRAD phantom requires the procedure for making a judgment as to the trueness or falseness of the result of the indication having been made by the person, who sees the CDRAD phantom image, with respect to the 225 lattice regions per CDRAD phantom image, and thereby obtaining the trueness-falseness results, the procedure for correcting the thus obtained trueness-falseness results, and the procedure for forming the CD curve from the corrected trueness-falseness results. Therefore, the evaluation time per CDRAD phantom image becomes as long as approximately 15 minutes. Also, in the cases of the image evaluation utilizing the CDRAD phantom, as in the cases of the image evaluation utilizing the Burger phantom, it may often occur that the results of the image evaluation are affected by the subjectivity of the person, who sees the CDRAD phantom image. Therefore, such that a statistical difference among the persons, who see the CDRAD phantom image, may be suppressed, it is necessary for the image evaluation of a CDRAD phantom image to be made by at least three persons, who see the CDRAD phantom image. Further, such that a difference in image recording conditions may be suppressed statistically, it is necessary for at least three CDRAD phantom images to be recorded and subjected to the image evaluation. Furthermore, in cases where a value of a parameter for image processing, which is performed on an image signal with an image processing unit, is altered, and the images obtained from the image processing are subjected to the image evaluation, it is necessary for at least three CDRAD phantom images to be prepared with respect to each of the altered values of the parameter. Accordingly, the technique for performing the image evaluation by use of the CDRAD phantom has the problems in that considerable time and labor are required to perform the image evaluation, and the cost for evaluation, such personnel expenses, cannot be kept low.

Also, the image evaluation utilizing the CDRAD phantom is the visual evaluation made by the human. Therefore, the problems occur in that the results of the image evaluation often vary, depending upon the environmental conditions under which the CDRAD phantom image is seen, i.e., the brightness at the site of the image evaluation, the time at which the image evaluation is made, the order in which the CDRAD phantom images are evaluated, the physical condition and the mental condition of the person, who sees the CDRAD phantom image, and the like, and reliable evaluation results cannot be obtained.

SUMMARY OF THE INVENTION

The primary object of the present invention is to provide an image evaluating method, with which image evaluation utilizing a CDRAD phantom, or the like, is capable of being performed efficiently.

Another object of the present invention is to provide an apparatus for carrying out the image evaluating method.

A further object of the present invention is to provide a computer program for causing a computer to execute the image evaluating method.

The specific object of the present invention is to provide a computer readable recording medium, on which the computer program has been recorded.

The present invention provides an image evaluating method, comprising the steps of:

i) accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions, ii) detecting the positions of the signal areas, which are located in all of the evaluating regions in the evaluation object image, in accordance with a reference image signal, which represents a reference image with respect to the pattern, and the evaluation object image signal, and iii) performing evaluation of the evaluation object image in accordance with the results of the detection of the positions of the signal areas.

In the image evaluating method in accordance with the present invention, the predetermined position of the signal area may be a position determined previously as in the cases of a center position within a lattice region acting as the evaluating region in a CDRAD phantom image, or a position of one of four corner areas of the lattice region in the CDRAD phantom image. Alternatively, the predetermined position of the signal area may be a position of at least one signal area, which has been located at a random position within the evaluating region. Particularly, in cases where only one signal area is set within an evaluating region, the only one signal area should preferably be located at a random position within the evaluating region.

The term "contrast" as used herein means represents the difference in image density between the signal area within the evaluating region and regions other than the signal area within the evaluating region. A large difference in image density represents a high contrast, and a small difference in image density represents a low contrast.

The reference image signal is the image signal representing the same pattern as the pattern of the evaluation object image. The reference image signal has signal values such that the signal areas of smaller sizes and lower contrasts than the sizes and the contrasts of the signal areas, which are recognizable with the evaluation object image signal, are still capable of being recognized. Therefore, in the reference image reproduced from the reference image signal, the signal areas ranging up to the signal areas of smaller sizes and lower contrasts than the sizes and the contrasts of the signal areas, which are recognizable in the evaluation object image, are capable of being recognized. Also, the reference image signal may have the signal values such that the signal areas of all sizes and all contrasts are capable of being recognized.

The image evaluating method in accordance with the present invention should preferably be modified such that the detection of the positions of the signal areas is performed after position matching between the reference image and the evaluation object image has been performed.

Also, the image evaluating method in accordance with the present invention may be modified such that each of the evaluating regions in the evaluation object image and the corresponding evaluating region in the reference image are divided respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and the detection of the position of the signal area of the evaluating region in the evaluation object image is performed in accordance with signal values within the corresponding evaluating subregions of the corresponding evaluating regions in the evaluation object image and the reference image.

In such cases, the sizes of the evaluating subregions should preferably be altered in accordance with the size of the signal area.

Also, in such cases, the image evaluating method in accordance with the present invention should preferably be modified such that a calculation is made to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and the position of an evaluating subregion of the evaluating region in the evaluation object image, which evaluating subregion is associated with the maximum correlation value among the plurality of the correlation values having thus been calculated, is detected as the position of the signal area of the evaluating region in the evaluation object image.

Further, the image evaluating method in accordance with the present invention may be modified such that each of the evaluating regions in the evaluation object image is divided into a plurality of evaluating subregions having approximately identical sizes, such that each of the plurality of the evaluating subregions is capable of containing one signal area, a test area is obtained from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and the detection of the position of the signal area of the evaluating region in the evaluation object image is performed in accordance with signal values within the plurality of the evaluating subregions of the evaluating region in the evaluation object image and signal values within the test area of the corresponding evaluating region in the reference image.

In such cases, the sizes of the evaluating subregions and the size of the test area should preferably be altered in accordance with the sizes of the signal areas.

Also, in such cases, the image evaluating method in accordance with the present invention should preferably be modified such that a calculation is made to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area of the corresponding evaluating region in the reference image, and the position of an evaluating subregion of the evaluating region in the evaluation object image, which evaluating subregion is associated with the maximum correlation value among the plurality of the correlation values having thus been calculated, is detected as the position of the signal area of the evaluating region in the evaluation object image.

The present invention also provides an image evaluating apparatus, comprising:

i) input means for accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions, ii) detection means for detecting the positions of the signal areas, which are located in all of the evaluating regions in the evaluation object image, in accordance with a reference image signal, which represents a reference image with respect to the pattern, and the evaluation object image signal, and iii) evaluation means for performing evaluation of the evaluation object image in accordance with the results of the detection of the positions of the signal areas.

The image evaluating apparatus in accordance with the present invention should preferably be modified such that the apparatus further comprises position matching means for performing position matching between the reference image and the evaluation object image, and the detection means is means for performing the detection of the positions of the signal areas after the position matching between the reference image and the evaluation object image has been performed by the position matching means.

Also, the image evaluating apparatus in accordance with the present invention may be modified such that the detection means is means for:

dividing each of the evaluating regions in the evaluation object image and the corresponding evaluating region in the reference image respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and performing the detection of the position of the signal area of the evaluating region in the evaluation object image in accordance with signal values within the corresponding evaluating subregions of the corresponding evaluating regions in the evaluation object image and the reference image.

In such cases, the image evaluating apparatus in accordance with the present invention may be modified such that the detection means alters the sizes of the evaluating subregions in accordance with the size of the signal area.

Also, in such cases, the image evaluating apparatus in accordance with the present invention may be modified such that the detection means is means for:

making a calculation to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

Further, the image evaluating apparatus in accordance with the present invention maybe modified such that the detection means is means for:

dividing each of the evaluating regions in the evaluation object image into a plurality of evaluating subregions having approximately identical sizes, such that each of the plurality of the evaluating subregions is capable of containing one signal area, obtaining a test area from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and performing the detection of the position of the signal area of the evaluating region in the evaluation object image in accordance with signal values within the plurality of the evaluating subregions of the evaluating region in the evaluation object image and signal values within the test area of the corresponding evaluating region in the reference image.

In such cases, the image evaluating apparatus in accordance with the present invention may be modified such that the detection means alters the sizes of the evaluating subregions and the size of the test area in accordance with the sizes of the signal areas.

Also, in such cases, the image evaluating apparatus in accordance with the present invention may be modified such that the detection means is means for:

making a calculation to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area of the corresponding evaluating region in the reference image, and detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

The present invention further provides a computer program for causing a computer to execute the image evaluating method in accordance with the present invention.

The present invention still further provides a computer readable recording medium, on which the computer program for causing a computer to execute the image evaluating method in accordance with the present invention has been recorded.

A skilled artisan would know that the computer readable recording medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of the present invention. Additionally, computer code/instructions include, but are not limited to, source, object, and executable code and can be in any language including higher level languages, assembly language, and machine language.

With the image evaluating method and apparatus in accordance with the present invention, the input of the evaluation object image signal representing the evaluation object image is accepted, and the positions of the signal areas, which are located in all of the evaluating regions in the evaluation object image, are detected in accordance with the reference image signal, which represents the reference image, and the evaluation object image signal. Also, the evaluation of the evaluation object image is performed in accordance with the results of the detection of the positions of the signal areas. Therefore, the problems are capable of being prevented from occurring in that subjective factors of the person, who sees the evaluation object image and evaluates the evaluation object image, and environmental conditions, under which the evaluation is performed, are reflected upon the results of the evaluation. As a result, objective and reliable evaluation results are capable of being obtained. Also, it is sufficient for the evaluation object image signal to be inputted, and evaluation results of high objectivity are capable of being obtained. Therefore, it is not necessary for a plurality of evaluation object images to be evaluated by many evaluators. As a result, the evaluation of the image quality of obtained images is capable of being performed efficiently.

With the image evaluating method and apparatus in accordance with the present invention, wherein the detection of the positions of the signal areas is performed after the position matching between the reference image and the evaluation object image has been performed, the accuracy, with which the positions of the signal areas are detected, is capable of being enhanced.

With the image evaluating method and apparatus in accordance with the present invention, each of the evaluating regions in the evaluation object image and the corresponding evaluating region in the reference image may be divided respectively into the plurality of the evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image. Also, the detection of the-position of the signal area of the evaluating region in the evaluation object image may be performed in accordance with the signal values within the corresponding evaluating subregions of the corresponding evaluating regions in the evaluation object image and the reference image. With the modification described above, the detection of the position of the signal area of the evaluating region in the evaluation object image is capable of being performed easily.

In the modification described above, the sizes of the evaluating subregions may be altered in accordance with the size of the signal area. In such cases, the accuracy, with which the positions of the signal areas are detected, is capable of being enhanced.

Also, in the modification described above, a calculation may be made to find the correlation value between the corresponding evaluating subregions in the evaluation object image and the reference image. In this manner, the plurality of the correlation values may be calculated with respect to the plurality of sets of the corresponding evaluating subregions of the corresponding evaluating regions in the evaluation object image and the reference image. The position of the evaluating subregion of the evaluating region in the evaluation object image, which evaluating subregion is associated with the maximum correlation value among the plurality of the correlation values having thus been calculated, may then be detected as the position of the signal area of the evaluating region in the evaluation object image. In such cases, the detection of the position of the signal area of the evaluating region in the evaluation object image is capable of being performed with simple operation processing.

Further, with the image evaluating method and apparatus in accordance with the present invention, each of the evaluating regions in the evaluation object image maybe divided into the plurality of the evaluating subregions having approximately identical sizes, such that each of the plurality of the evaluating subregions is capable of containing one signal area. The test area may then be obtained from the evaluating region in the reference image, which evaluating region corresponds to the evaluating region in the evaluation object image, the test area having the size, which corresponds to the sizes of the evaluating subregions of the evaluating region in the evaluation object image, and containing one signal area. Also, the detection of the position of the signal area of the evaluating region in the evaluation object image may be performed in accordance with the signal values within the plurality of the evaluating subregions of the evaluating region in the evaluation object image and the signal values within the test area of the corresponding evaluating region in the reference image. With the modification described above, the detection of the position of the signal area of the evaluating region in the evaluation object image is capable of being performed more easily.

In the modification described above, the sizes of the evaluating subregions and the size of the test area may be altered in accordance with the sizes of the signal areas. In such cases, the accuracy, with which the positions of the signal areas are detected, is capable of being enhanced.

Also, in the modification described above, a calculation may be made to find the correlation value between each of the evaluating subregions of the evaluating region in the evaluation object image and the test area of the corresponding evaluating region in the reference image. In this manner, the plurality of the correlation values may be calculated with respect to the plurality of sets of the evaluating subregions of the evaluating region in the evaluation object image and the test area of the corresponding evaluating region in the reference image. The position of the evaluating subregion of the evaluating region in the evaluation object image, which evaluating subregion is associated with the maximum correlation value among the plurality of the correlation values having thus been calculated, may then be detected as the position of the signal area of the evaluating region in the evaluation object image. In such cases, the detection of the position of the signal area of the evaluating region in the evaluation object image is capable of being performed with simple operation processing.

BRIEF DESCRIPTION OF THE DRAWINGS

FIG. 8A is an explanatory view showing an example of a lattice region, in which a size of a signal area is small, FIG. 8B is an explanatory view showing how the sizes of detecting areas are altered in accordance with the size of the signal area, FIG. 9 is an explanatory view showing a detection result table, FIG. 10 is an explanatory view showing a true position table, FIG. 11 is an explanatory view showing a trueness-falseness table, FIG. 12 is an explanatory view showing a corrected trueness-falseness table.

DESCRIPTION OF THE PREFERRED EMBODIMENTS

The present invention will hereinbelow be described in further detail with reference to the accompanying drawings.

Figure 1:
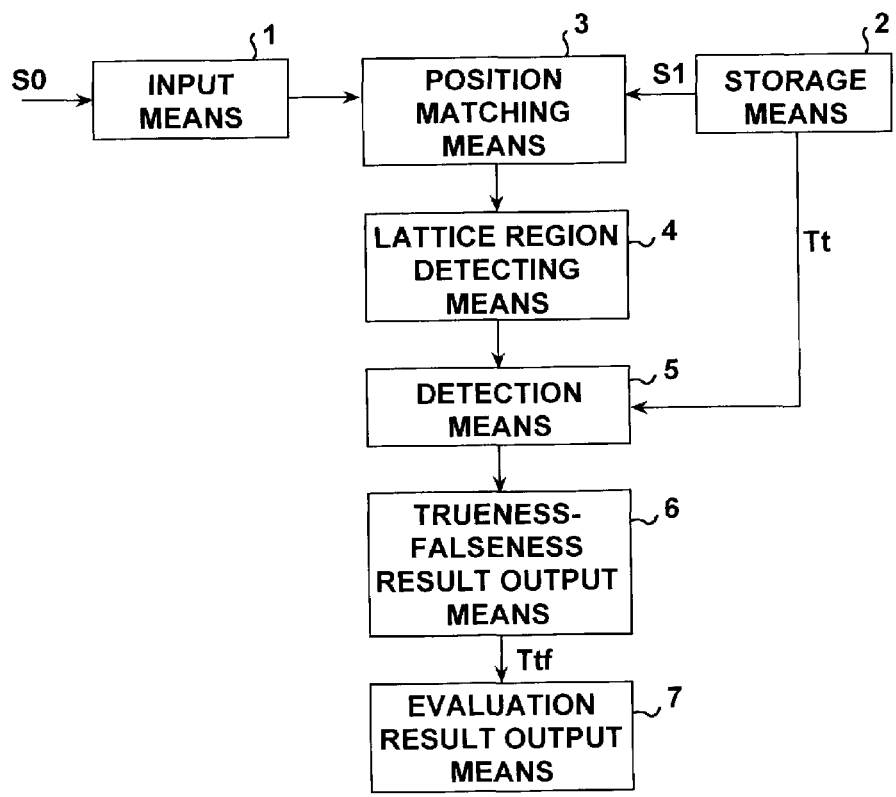
FIG. 1 is a block diagram showing an embodiment of the image evaluating apparatus in accordance with the present invention.

FIG. 1 is a block diagram showing an embodiment of the image evaluating apparatus in accordance with the present invention. The embodiment of the image evaluating apparatus illustrated in FIG. 1 is constituted in order to perform the evaluation of an image, which is obtained from a radiation image recording and read-out apparatus for recording a radiation image of an object and obtaining an image signal representing the radiation image of the object, or which is obtained from an image processing unit for performing image processing on the image signal having been obtained from the radiation image recording and read-out apparatus in order to obtain a processed image signal. Also, in this embodiment, an image signal, which represents a CDRAD phantom image obtained from an image recording operation performed on a CDRAD phantom, is taken as an object of the image evaluation.

As illustrated in FIG. 1, the embodiment of the image evaluating apparatus in accordance with the present invention comprises input means 1 for accepting an input of an evaluation object image signal S0 representing the evaluation object image, which is to be evaluated. The image evaluating apparatus also comprises storage means 2 for storing a reference image signal S1 representing a reference image, which is to be utilized for the image evaluation. The image evaluating apparatus further comprises position matching means 3 for performing position matching between the evaluation object image and the reference image. The image evaluating apparatus still further comprises lattice region detecting means 4 for detecting a plurality of lattice regions, which are partitioned with lattice lines of the CDRAD phantom, with respect to the evaluation object image and the reference image, whose positions have been matched with each other by the position matching means 3. The image evaluating apparatus also comprises detection means 5 for detecting the position of a signal area in each of the lattice regions in the evaluation object image and acquiring the results of the detection of the signal areas of the lattice regions in the evaluation object image. The image evaluating apparatus further comprises trueness-falseness result output means 6 for receiving the results of the detection of the signal areas of the lattice regions in the evaluation object image from the detection means 5, and obtaining trueness-falseness results from the results of the detection of the signal areas of the lattice regions in the evaluation object image. The image evaluating apparatus still further comprises evaluation result output means 7 for receiving the trueness-falseness results from the trueness-falseness result output means 6, and forming evaluation results in accordance with the trueness-falseness results.

The input means 1 accepts the input of the evaluation object image signal S0. Specifically, the input means 1 may be constituted of a media driver for reading the evaluation object image signal S0 from media, on which the evaluation object image signal S0 has been stored, an interface for receiving the evaluation object image signal S0 having been transferred through a network, or the like.

Figure 2:
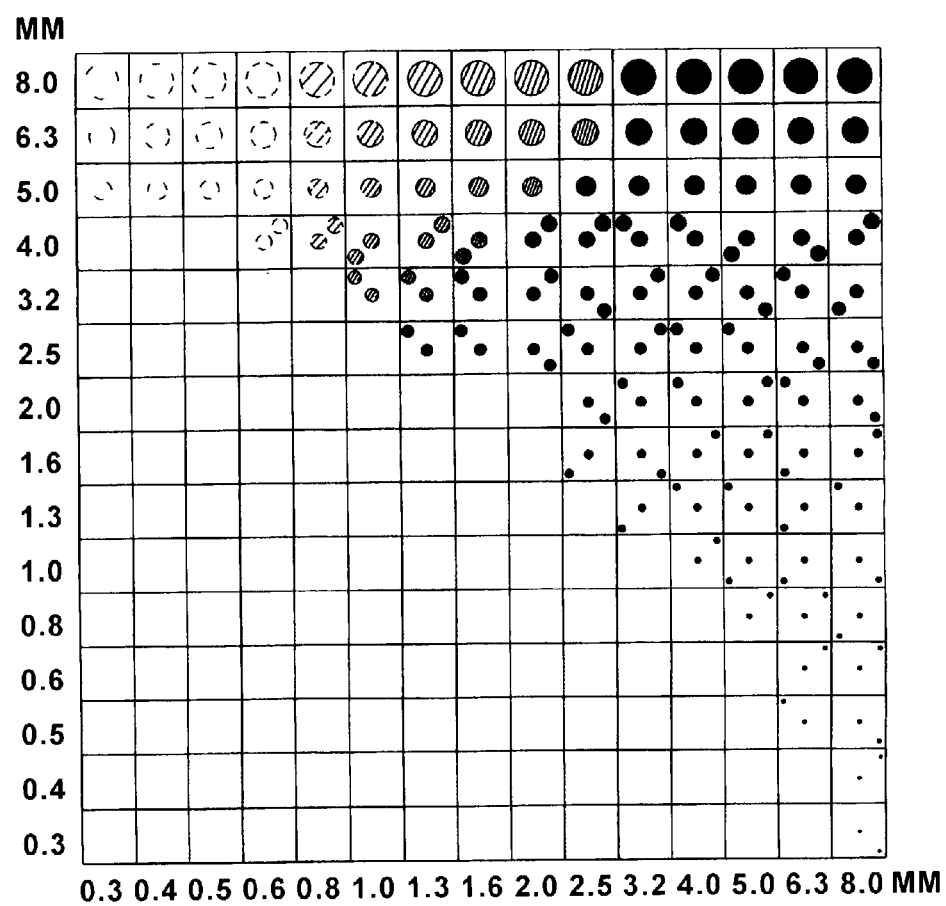
FIG. 2 is an explanatory view showing an example of a CDRAD phantom image.

The evaluation object image signal S0 is obtained from an operation for recording a radiation image of the CDRAD phantom and represents the CDRAD phantom image. FIG. 2 is an explanatory view showing an example of the CDRAD phantom image. The holes within the lattice regions constituting the CDRAD phantom are formed such that the diameter of each of the holes becomes small toward the bottom row in the array of the lattice regions, and such that the depth of each of the holes becomes small toward the left-hand end column in the array of the lattice regions. Therefore, as illustrated in FIG. 2, as the location of the lattice region becomes close to the lower left-hand corner of the CDRAD phantom, the image pattern of the hole formed within the lattice region becomes hard to see. In the CDRAD phantom image illustrated in FIG. 2, the numerals indicated on the left-hand side of the lattice regions represent the diameters of the holes. Also, the numerals indicated on the bottom side of the lattice regions represent the depths of the holes. Further, in each of the lattice regions, the area located at the position corresponding to the position of a hole of the CDRAD phantom constitutes the signal area.

The storage means 2 stores the reference image signal S1. Specifically, the storage means 2 may be constituted of a hard disk located in a computer. As in the cases of the evaluation object image signal S0, the reference image signal S1 is acquired from an operation for recording a radiation image of the CDRAD phantom. By way of example, in cases where the reference image signal S1 is to be acquired, the operation for recording the radiation image of the CDRAD phantom is performed with a radiation dose at least 10 times as large as the radiation dose employed in cases where the evaluation object image signal S0 is to be acquired. As a result, the reference image reproduced from the reference image signal S1 has a signal-to-noise ratio higher than the signal-to-noise ratio of the evaluation object image. Therefore, in the reference image, hole image patterns ranging up to the hole image patterns of holes having smaller sizes and smaller depths than the hole sizes and the hole depths of the hole image patterns, which are visually perceptible in the evaluation object image, are capable of being visually perceived.

When necessary, the reference image signal S1 may be formed artificially by making reference to the CDRAD phantom, such that the image patterns of all holes of the CDRAD phantom are visually perceptible.

The position matching means 3 performs the position matching between the reference image and the evaluation object image by taking the position of the evaluation object image as a reference position. Specifically, filtering processing is performed on the evaluation object image by use of a cross type filter for detecting the positions of line intersections, and lattice points on the evaluation object image are detected. Also, template regions are set by taking the lattice points, which have been detected on the evaluation object image, as reference points, and template matching is performed on the reference image by use of the template regions. In this manner, corresponding lattice points, which correspond to the lattice points on the evaluation object image, are set on the reference image. Further, with affine transform, the positions of the corresponding lattice points on the reference image are matched with the positions of the lattice points on the evaluation object image. In this manner, the position matching between the reference image and the evaluation object image is performed. The position matching technique utilizing the cross type filter is described in, for example, Japanese Unexamined Patent Publication No. 8(1996) -83336.

Alternatively, the position matching may be performed by taking the position of the reference image as a reference position, such that the position of the evaluation object image is matched with the position of the reference image.

Figure 3:
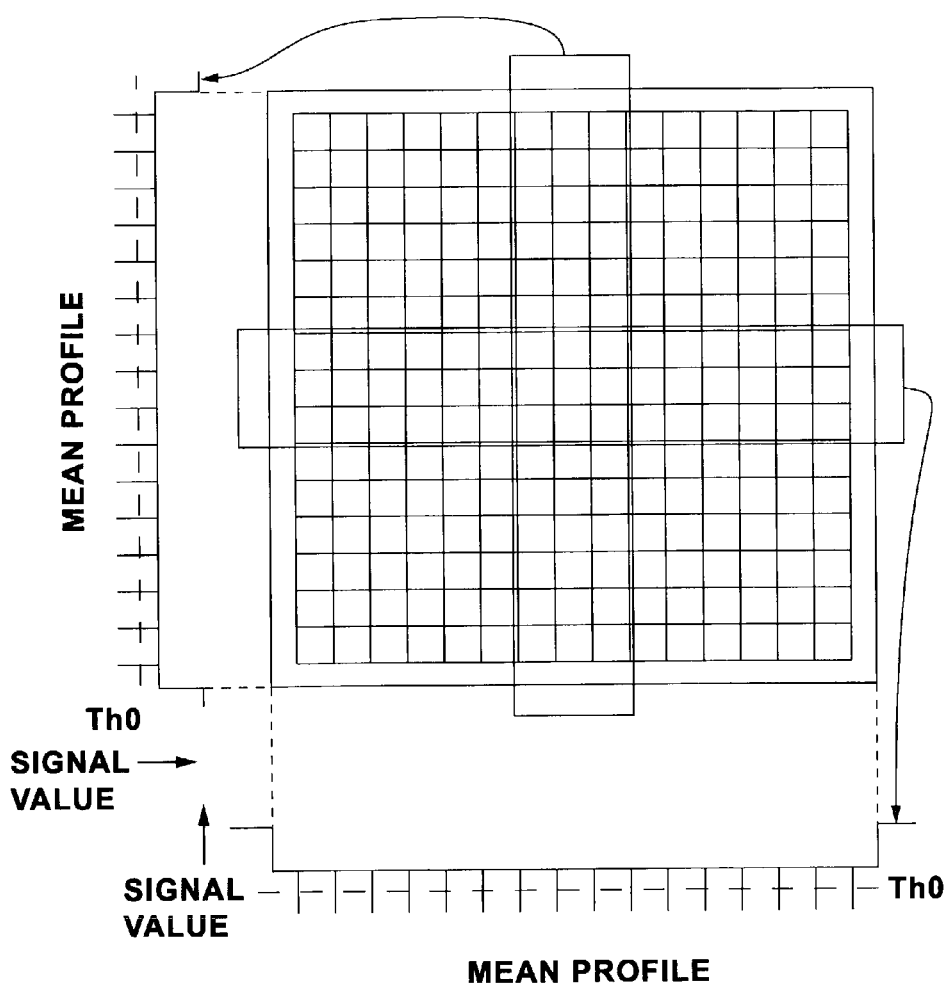
FIG. 3 is an explanatory view showing how mean profiles of each of a reference image and an evaluation object image are calculated.

The lattice region detecting means 4 detects the lattice regions in the manner described below. Specifically, as illustrated in FIG. 3, with respect to the reference image whose position has been matched with the position of the evaluation object image, mean profiles of the reference image are calculated for an image area, which corresponds to approximately three rows in the vicinity of a center row with respect to the vertical direction of the reference image, and for an image area, which corresponds to approximately three columns in the vicinity of a center column with respect to the horizontal direction of the reference image. The region outward from the CDRAD phantom is the region, upon which the radiation impinges directly, and therefore the signal values of the profiles become large with respect to the region outward from the CDRAD phantom. Also, with respect to the lattice lines, the signal values of the profiles become small. Further, in cases where the mean profiles are calculated, local area limited signal components, which represent the image patterns of the holes of the CDRAD phantom and noise in the image, are smoothed. Therefore, the mean profiles with respect to the surface of the CDRAD phantom take signal values, which are larger than the signal values representing the lattice lines and are approximately uniform. The mean profiles may be calculated with respect to the entire region of the reference image. However, in this embodiment, such that the time required to perform the operation processing may be kept short, the mean profiles of the reference image are calculated for the image area, which corresponds to approximately three rows in the vicinity of the center row with respect to the vertical direction of the reference image, and for the image area, which corresponds to approximately three columns in the vicinity of the center column with respect to the horizontal direction of the reference image.

Thereafter, binarization processing utilizing a threshold value Th0 is performed on the mean profiles having been calculated in the manner described above, and the positions of the lattice lines are thus detected from the mean profiles. Since the CDRAD phantom is constituted of 15×15 lattice regions, 16 lattice lines, which stand side by side with respect to the horizontal direction of the reference image, and 16 lattice lines, which stand side by side with respect to the vertical direction of the reference image, are detected. As the threshold value Th0, an intermediate value between the minimum value of the mean profile (i.e., the minimum value of the signal values representing the lattice lines) and the mean signal value of the signal values, which represent the surface of the CDRAD phantom, is employed. In order for the problems to be prevented from occurring in that an image area, which represents a letter contained in the CDRAD phantom, is detected by mistake as the position of a lattice line, after the threshold value Th0 has been set, the threshold value Th0 may be altered by stages to a small value until the 16 lattice lines are detected. Also, after the 16 lattice lines, which stand side by side with respect to the horizontal direction of the reference image, and the 16 lattice lines, which stand side by side with respect to the vertical direction of the reference image, have been detected, the 225 regions partitioned with the lattice lines are detected as the lattice regions. The positions of the four corners of each of the lattice regions are capable of being represented by coordinate values, which are set on the reference image.

As for the evaluation object image, the calculation of the mean profiles and the detection of the lattice lines are performed in the same manner as that for the reference image. In this manner, the lattice regions in the evaluation object image are detected.

Figure 4:
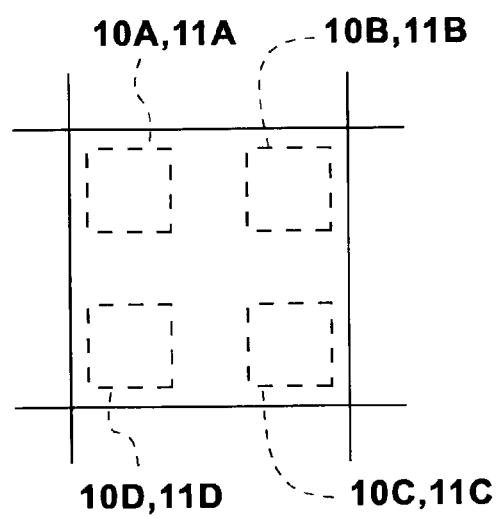
FIG. 4 is an explanatory view showing a lattice region.

The detection means 5 detects the position of a signal area in each of the lattice regions in the evaluation object image in the manner described below. How the detection of the position of the signal area is performed with respect to each of the lattice regions, which are located along the 12 lower rows in the array of the lattice regions in the CDRAD phantom image, i.e. the lattice regions each of which contains two hole image patterns, will be described hereinbelow. Firstly, with respect to each of corresponding lattice regions in the evaluation object image and the reference image, a signal area, which is represented by the signal components representing a hole image pattern, is detected. FIG. 4 is an explanatory view showing a lattice region. Within each of the corresponding lattice regions in the evaluation object image and the reference image, an area that has possibility of containing a signal area is one of the four corners areas, except for a center area. Therefore, as indicated by the broken lines in FIG. 4, detecting areas 10A, 10B, 10C, and 10D, each of which has a predetermined range for the detection of the signal area, are set in the vicinity of the four corner areas of the lattice region in the evaluation object image. Also, as indicated by the broken lines in FIG. 4, detecting areas 11A, 11B, 11C, and 11D, each of which has a predetermined range for the detection of the signal area, are set in the vicinity of the four corner areas of the lattice region in the reference image. The detecting areas 10A, 10B, 10C, and 10D of the lattice region in the evaluation object image are set by taking the coordinate values of the four corners of the lattice region as the reference values. Also, the detecting areas 11A, 11B, 11C, and 11D of the lattice region in the reference image are set by taking the coordinate values of the four corners of the lattice region as the reference values.

Figure 5:
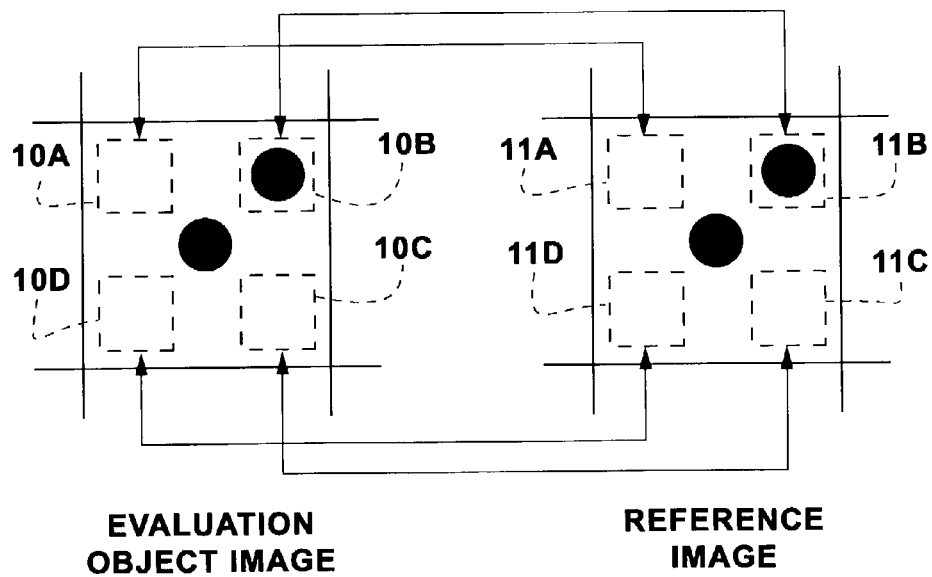
FIG. 5 is an explanatory view showing how correlation values are calculated.

Also, as illustrated in FIG. 5, with respect to the set of the corresponding detecting areas 10A and 11A of the corresponding lattice regions in the evaluation object image and the reference image, a normalized cross correlation value C between the signal values within the detecting area 10A and the signal values within the detecting area 11A is calculated with Formula (1) shown below. In the same manner, the normalized cross correlation value C of the signal values is calculated with respect to each of the set of the corresponding detecting areas 10B and 11B of the corresponding lattice regions in the evaluation object image and the reference image, the set of the corresponding detecting areas 10C and 11C of the corresponding lattice regions in the evaluation object image and the reference image, and the set of the corresponding detecting areas 10D and 11D of the corresponding lattice regions in the evaluation object image and the reference image. Further, a detecting area of the lattice region in the evaluation object image, which detecting area is associated with the maximum normalized cross correlation value C among the normalized cross correlation values C, C, C, C having thus been calculated, is detected as the signal area in which the hole image pattern is embedded.

$$C = \frac{\sum_x \sum_y \{(f(x, y) - f_{ave}) \times (g(x, y) - g_{ave})\}}{\sqrt{\sum_x \sum_y (f(x, y) - f_{ave})^2} \times \sqrt{\sum_x \sum_y (g(x, y) - g_{ave})^2}} \quad (1)$$

wherein f (x, y) represents the signal value within the detecting area in the evaluation object image, $f_{ave}$ represents the mean value of the signal values within the detecting area in the evaluation object image, g(x, y) represents the signal value within the detecting area in the reference image, and $g_{ave}$ represents the mean value of the signal values within the detecting area in the reference image.

In the example shown in FIG. 5, the detecting area 10B of the lattice region in the evaluation object image contains the hole image pattern. Therefore, the normalized cross correlation value C between the signal values within the detecting area 10B and the signal values within the detecting area 11B takes a value close to 1. With respect to each the other detecting areas 10A, 10C, and 10D of the lattice region in the evaluation object image, which detecting areas do not contain the hole image pattern, each of the normalized cross correlation value C between the signal values within the detecting area 10A and the signal values within the detecting area 11A, the normalized cross correlation value C between the signal values within the detecting area 10C and the signal values within the detecting area 11C, and the normalized cross correlation value C between the signal values within the detecting area 10D and the signal values within the detecting area 11D takes a value close to 0 due to effects of noise contained in the image. Therefore, in the example shown in FIG. 5, the detecting area 10B of the lattice region in the evaluation object image is detected as the signal area.

Figure 6:
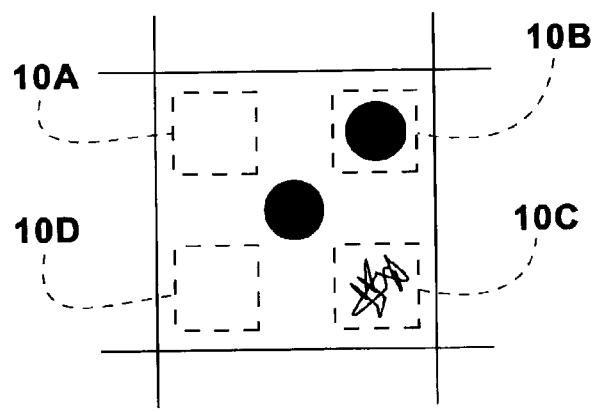
FIG. 6 is an explanatory view showing an example of a lattice region, in which a dust image pattern is embedded.

FIG. 6 is an explanatory view showing an example of a lattice region, in which a dust image pattern is embedded. As illustrated in FIG. 6, in cases where a dust image pattern is embedded in the detecting area 10C of the lattice region in the evaluation object image, it cannot be found with visual evaluation which one of the detecting area 10B and the detecting area 10C is the signal area. However, with the embodiment of the image evaluating apparatus in accordance with the present invention, in the manner described above, the calculation is made to find each of the normalized cross correlation value C between the signal values within the detecting area 10B of the lattice region in the evaluation object image and the signal values within the detecting area 11B of the corresponding lattice region in the reference image and the normalized cross correlation value C between the signal values within the detecting area 10C of the lattice region in the evaluation object image and the signal values within the detecting area 11C of the corresponding lattice region in the reference image. As a result, the normalized cross correlation value C between the signal values within the detecting area 10B of the lattice region in the evaluation object image and the signal values within the detecting area 11B of the corresponding lattice region in the reference image takes a value close to 1. However, the normalized cross correlation value C between the signal values within the detecting area 10C of the lattice region in the evaluation object image and the signal values within the detecting area 11C of the corresponding lattice region in the reference image takes a value close to 0. Therefore, with the embodiment of the image evaluating apparatus in accordance with the present invention, the position of the signal area in each of the lattice regions in the evaluation object image is capable of being detected more accurately than with the technique for making visual evaluation of image quality.

With respect to each of the lattice regions, which are located along each of the top row, the second top row, and third top row in the array of the lattice regions in the CDRAD phantom image, a detecting area is set at the center position within the lattice region in the evaluation object image, and the corresponding detecting area is set at the center position within the corresponding lattice region in the reference image. Also, a calculation is made to find the normalized cross correlation value C between the signal values within the detecting area of the lattice region in the evaluation object image and the signal values within the corresponding detecting area of the lattice region in the reference image.

Figure 7A:
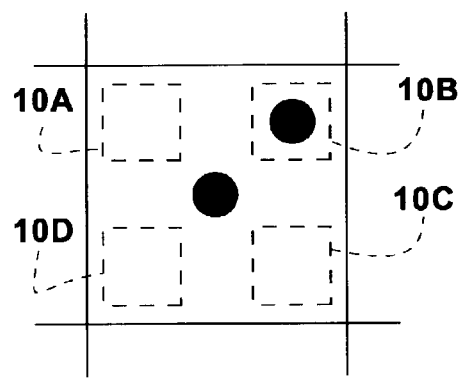
FIG. 7A is an explanatory view showing detecting areas, which are set within a lattice region in an evaluation object image.
Figure 7B:
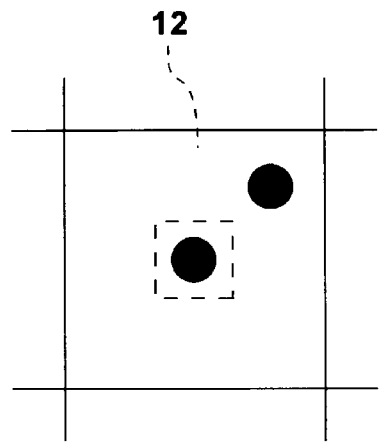
FIG. 7B is an explanatory view showing a detecting area, which is set within a lattice region in a reference image.

The signal area detecting technique described above will herein below be referred to as the first signal area detecting technique. In lieu of the first signal area detecting technique being employed, a second signal area detecting technique described below may be employed in order to detect the signal area. FIG. 7A is an explanatory view showing detecting areas, which are set within a lattice region in an evaluation object image. FIG. 7B is an explanatory view showing a detecting area, which is set within a lattice region in a reference image. Firstly, as illustrated in FIG. 7A, the detecting areas 10A, 10B, 10C, and 10D are set within the lattice region in the evaluation object image. Also, as illustrated in FIG. 7B, as for the corresponding lattice region in the reference image, a detecting area 12, which surrounds the hole image pattern located at the center position of the corresponding lattice region in the reference image, is set. In this case, the size of each of the detecting areas 10A, 10B, 10C, and 10D in the evaluation object image and the size of the detecting area 12 in the reference image are identical with each other. Also, with respect to the set of the detecting area 10A of the lattice region in the evaluation object image and the detecting area 12 of the corresponding lattice region in the reference image, the normalized cross correlation value C between the signal values within the detecting area 10A and the signal values within the detecting area 12 is calculated with Formula (1) shown above. In the same manner, the normalized cross correlation value C of the signal values is calculated with respect to each of the set of the detecting area 10B of the lattice region in the evaluation object image and the detecting area 12 of the corresponding lattice region in the reference image, the set of the detecting area 10C of the lattice region in the evaluation object image and the detecting area 12 of the corresponding lattice region in the reference image, and the set of the detecting area 10D of the lattice region in the evaluation object image and the detecting area 12 of the corresponding lattice region in the reference image. Further, a detecting area of the lattice region in the evaluation object image, which detecting area is associated with the maximum normalized cross correlation value C among the normalized cross correlation values C, C, C, C having thus been calculated, is detected as the signal area in which the hole image pattern is embedded. In the example shown in FIGS. 7A and 7B, the detecting area 10B of the lattice region in the evaluation object image is detected as the signal area.

As illustrated in FIG. 6, in cases where the dust image pattern is embedded in the detecting area 10C of the lattice region in the evaluation object image, besides the normalized cross correlation value C between the signal values within the detecting area 10B and the signal values within the detecting area 12, the normalized cross correlation value C between the signal values within the detecting area 10C and the signal values within the detecting area 12 also takes a large value. Therefore, there is the risk that the detecting area 10C of the lattice region in the evaluation object image will be detected as the signal area. Accordingly, the second signal area detecting technique has a detection accuracy lower than the detection accuracy of the first signal area detecting technique.

FIG. 8A is an explanatory view showing an example of a lattice region, in which a size of a signal area is small. FIG. 8B is an explanatory view showing how the sizes of detecting areas are altered in accordance with the size of the signal area. As illustrated in FIG. 8A, in cases where the diameter of the hole image pattern becomes small, the ratio of the signal area to each of the detecting areas 10A, 10B, 10C, and 10D becomes low. Therefore, in such cases, the normalized cross correlation value C calculated becomes small, and the signal area cannot be detected accurately. Accordingly, in such cases, as illustrated in FIG. 8B, the sizes of the detecting areas 10A, 10B, 10C, and 10D are altered in accordance with the diameter of the hole image pattern, i.e., the size of the signal area. As a result, the normalized cross correlation value C is capable of being calculated accurately, and therefore the signal area is capable of being detected accurately.

After the signal areas have been detected with respect to all of the lattice regions, the positions of the detected signal areas are outputted as a detection result table. FIG. 9 is an explanatory view showing a detection result table. In the detection result table, the numeral "0" indicated for each of the lattice regions represents that the position of the detected signal area is the upper left-hand corner area of the lattice region. Also, the numeral "1" indicated for each of the lattice regions represents that the position of the detected signal area is the upper right-hand corner area of the lattice region. Further, the numeral "2" indicated for each of the lattice regions represents that the position of the detected signal area is the lower right-hand corner area of the lattice region, and the numeral "3" indicated for each of the lattice regions represents that the position of the detected signal area is the lower left-hand corner area of the lattice region.

As for a certain lattice region, it may often occur that the normalized cross correlation values C, C, . . . take an identical value with respect to a plurality of detecting areas among the detecting areas 10A, 10B, 10C, and 10D of the certain lattice region, or that the normalized cross correlation value C takes a value larger than 1 due to adverse effects of noise, and the like. In such cases, it is regarded that the position of the signal area could not be detected with respect to the certain lattice region, and the numeral "9" is outputted for the certain lattice region. With respect to each of the lattice regions, which are located along each of the top row, the second top row, and third top row in the array of the lattice regions in the CDRAD phantom image, the numeral "9" is outputted in cases where the normalized cross correlation value C takes a value larger than 1 due to adverse effects of noise, and the like, and the numeral "0" is outputted in the other cases.

The trueness-falseness result output means 6 receives the information, which represents the detection result table, from the detection means 5. The trueness-falseness result output means 6 also receives the information, which represents a true position table Tt, from the storage means 2. In accordance with the detection result table and the true position table Tt, the trueness-falseness result output means 6 obtains trueness-falseness results representing whether the detected signal area positions coincide with or do not coincide with the true positions.

FIG. 10 is an explanatory view showing the true position table Tt, which represents the true positions of signal areas. The true position table Tt has been formed artificially by seeing the CDRAD phantom. The information representing the true position table Tt is stored in the storage means 2. The trueness-falseness result output means 6 compares the detection result table and the true position table Tt with each other and forms the trueness-falseness results with respect to the lattice regions as a trueness-falseness table Ttf shown in FIG. 11. In FIG. 11, "T" represents that the detected signal area position coincides with the true position, and "F" represents that the detected signal area position does not coincide with the true position.

In the trueness-falseness results, it may occur with a probability of ¼ that the detected signal area position coincides by accident with the true position. In order for the problems to be eliminated, the trueness-falseness results are corrected in accordance with the rules described under (1) to (4) below.

(1) In cases where the signal area position having been detected respect to a lattice region (hereinbelow referred to as the lattice region of interest), for which the judgment as to the trueness or falseness of the detected signal area position is to be made, has been found to coincide with the true position, if the detected signal area positions having been detected with respect to at least two lattice regions, which are among the four (i.e., upper, lower, right-hand, and left-hand) nearest neighbor lattice regions, are found to coincide with the true positions, it should be regarded that the signal area position having been detected with respect to the lattice region of interest coincides with the true position. In cases where a lattice region, which is in contact with a side of the CDRAD phantom image, is taken as the lattice region of interest, if the signal area positions having been detected with respect to at least two lattice regions, which are among the three nearest neighbor lattice regions, are found to coincide with the true positions, it should be regarded that the signal area position having been detected with respect to the lattice region of interest coincides with the true position.

(2) In cases where only two nearest neighbor lattice regions exist, i.e. in cases where a lattice region located at one of the four corner areas of the CDRAD phantom image is taken as the lattice region of interest, and the signal area position having been detected with respect to the lattice region of interest has been found to coincide with the true position, if the signal area position having been detected with respect to one of the two nearest neighbor lattice regions is found to coincide with the true position, it should be regarded that the signal area position having been detected with respect to the lattice region of interest coincides with the true position.

(3) In cases where the signal area position having been detected with respect to the lattice region of interest has been found not to coincide with the true position, if the signal area positions having been detected with respect to at least three lattice regions, which are among the four nearest neighbor lattice regions, are found to coincide with the true positions, it should be regarded that the signal area position having been detected with respect to the lattice region of interest coincides with the true position. In cases where a lattice region, which is in contact with a side of the CDRAD phantom image, is taken as the lattice region of interest, and the signal area position having been detected with respect to the lattice region of interest has been found not to coincide with the true position, if the signal area positions having been detected with respect to all of the three nearest neighbor lattice regions are found to coincide with the true positions, it should be regarded that the signal area position having been detected with respect to the lattice region of interest coincides with the true position.

(4) In cases where a lattice region located at one of the four corner areas of the CDRAD phantom image is taken as the lattice region of interest, and the signal area position having been detected with respect to the lattice region of interest has been found not to coincide with the true position, if the signal area positions having been detected with respect to both the two nearest neighbor lattice regions are found to coincide with the true positions, it should be regarded that the signal area position having been detected with respect to the lattice region of interest coincides with the true position.

FIG. 12 is an explanatory view showing a corrected trueness-falseness table Ttf. In FIG. 12, the lattice region surrounded by the bold lines is the corrected lattice region. The information representing the corrected trueness-falseness table Ttf is fed into the evaluation result output means 7.

In the evaluation result output means 7, a CD curve is formed in accordance with the received information representing the corrected trueness-falseness table Ttf and feeds out the information representing the CD curve as the evaluation results. The CD curve is formed by plotting the limit values of the diameters and the depths of the holes corresponding to the hole image patterns embedded in the lattice regions, in which the detected signal area positions have been judged to coincide with the true positions, on a logarithmic graph. Specifically, with respect to each of the hole depths, the value (hereinbelow referred to as the limit value) of the diameter of the hole is found with respect to the lattice region corresponding to the smallest hole diameter among the hole diameters in the lattice regions, in which the detected signal area positions have been judged to coincide with the true positions. In this manner, the limit values of the hole diameters are found with respect to all of the hole depths. Also, the limit values of the hole diameters are plotted on the logarithmic graph, in which the logarithmic values of the hole depths are plotted on the horizontal axis, and the logarithmic values of the hole diameters are plotted on the vertical axis. In this manner, the CD curve is capable of being formed.

Figure 13:
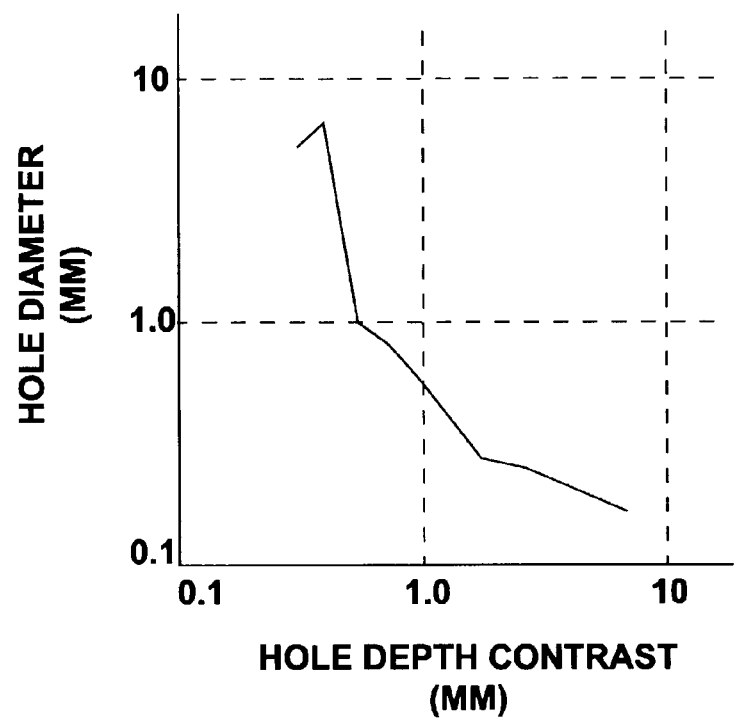
FIG. 13 is a graph showing a CD curve.

FIG. 13 is a graph showing the CD curve having been formed from the corrected trueness-falseness table Ttf illustrated in FIG. 12. In cases where an image pattern of a hole, which has a small diameter and a small depth, is perceptible in the CDRAD phantom image, the CD curve becomes close to the lower left-hand side on the graph. Therefore, it is capable of being found that, in cases where the CD curve becomes close to the lower left-hand side on the graph, the imaging system which yielded the evaluation object image signal S0 may be regarded as being capable of yielding an image of good image quality.

Together with the CD curve, a trueness ratio and a likelihood ratio of the signal area positions may be contained in the evaluation results. The likelihood ratio may be calculated as the total sum of the normalized cross correlation values C, C, . . . with respect to the lattice regions, in which the detected signal area positions have been judged to coincide with the true positions, among the normalized cross correlation values C, C, . . . having been calculated with respect to all of the 225 lattice regions. Alternatively, the likelihood ratio may be calculated as the value calculated with the formula shown below:

{(total sum of normalized cross correlation values with respect to lattice regions, in which detected signal area positions have been judged to coincide with true positions)/(number of lattice regions, in which detected signal area positions have been judged to coincide with true positions)}×100.

Figure 14:
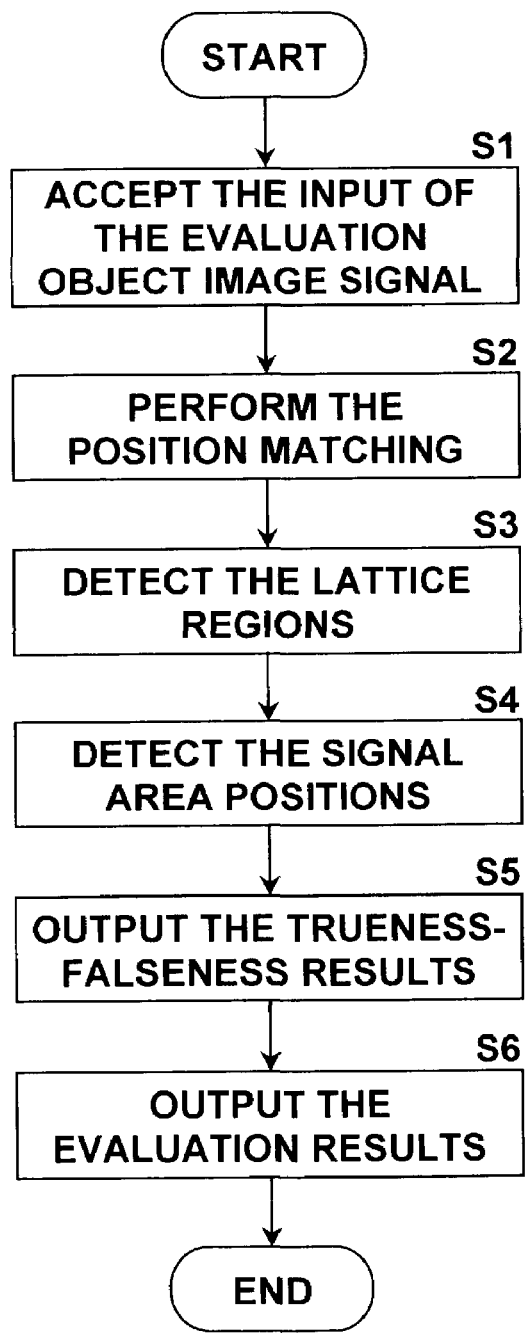
FIG. 14 is a flow chart showing how the embodiment of the image evaluating apparatus in accordance with the present invention operates.

How the embodiment of the image evaluating apparatus in accordance with the present invention operates will be described hereinbelow. FIG. 14 is a flow chart showing how the embodiment of the image evaluating apparatus in accordance with the present invention operates. Firstly, in a step S1, an input of the evaluation object image signal S0 is accepted. Also, in a step S2, the position matching between the evaluation object image and the reference image is performed by the position matching means 3 by use of the reference image signal S1, which has been stored in the storage means 2. After the position matching has been performed, in a step S3, the lattice regions in the evaluation object image and the reference image are detected by the lattice region detecting means 4. Thereafter, in a step S4, the position of the signal area is detected by the detection means 5 from each of the lattice regions in the evaluation object image. Also, in a step S5, the trueness-falseness results with respect to the signal area positions are outputted from the trueness-falseness result output means 6 in accordance with the detection results. In a step S6, the evaluation results are outputted from the evaluation result output means 7 in accordance with the trueness-falseness results. At this stage, the processing is finished.

As described above, with this embodiment of the image evaluating apparatus in accordance with the present invention, the evaluation of the image, which is obtained from the radiation image recording and read-out apparatus or the image processing unit, is performed in accordance with the evaluation object image signal S0 and the reference image signal S1. Therefore, the problems are capable of being prevented from occurring in that subjective factors of the person, who sees the evaluation object image and evaluates the evaluation object image, and environmental conditions, under which the evaluation is performed, are reflected upon the results of the evaluation. As a result, objective and reliable evaluation results are capable of being obtained. Also, it is sufficient for the evaluation object image signal S0 to be inputted, and evaluation results of high objectivity are capable of being obtained. Therefore, it is not necessary for a plurality of evaluation object images to be evaluated by many evaluators. As a result, the evaluation of the image quality of obtained images is capable of being performed efficiently.

In the embodiment described above, the evaluation object image signal S0 is obtained by recording the image of the CDRAD phantom. In cases where the evaluation is to be made for the image, which is obtained from the image processing unit, a CDRAD phantom image signal representing the CDRAD phantom image maybe formed artificially, the image processing may be performed by the image processing unit, which is to be subjected to the evaluation, and on the CDRAD phantom image signal, and the processed image signal having been obtained from the image processing may be utilized as the evaluation object image signal S0. In such cases, as the reference image signal S1, the CDRAD phantom image signal before being subjected to the image processing may be utilized.

Also, in the embodiment described above, the evaluation object image signal S0 is obtained by recording the image of the CDRAD phantom. Alternatively, in lieu of the CDRAD phantom being utilized, an image of, for example, a phantom, in which a hole is formed only at one of four corner areas of each of lattice regions, maybe recorded, and an evaluation object image signal S0 representing the thus recorded image may be obtained. Thus, in the image evaluating apparatus in accordance with the present invention, various kinds of images having a pattern composed of a plurality of evaluating regions, in each of which at least one signal area is located at a predetermined position, the evaluating regions having been set such that the size and the contrast of the signal area vary by stages for different evaluating regions, may be employed as the evaluation object image and the reference image.

What is claimed is:

1. An image evaluating method, comprising the steps of:
   i) accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions,
   ii) detecting the positions of the signal areas, which are located in all of the evaluating regions in the evaluation object image, in accordance with a reference image signal, which represents a reference image with respect to the pattern, and the evaluation object image signal, and
   iii) performing evaluation of the evaluation object image in accordance with the results of the detection of the positions of the signal areas.

2. A method as defined in claim 1 wherein the detection of the positions of the signal areas is performed after position matching between the reference image and the evaluation object image has been performed.

3. A method as defined in claim 1 or 2 wherein each of the evaluating regions in the evaluation object image and the corresponding evaluating region in the reference image are divided respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and
   the detection of the position of the signal area of the evaluating region in the evaluation object image is performed in accordance with signal values within the corresponding evaluating subregions of the corresponding evaluating regions in the evaluation object image and the reference image.

4. A method as defined in claim 3 wherein the sizes of the evaluating subregions are altered in accordance with the size of the signal area.

5. A method as defined in claim 3 wherein a calculation is made to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and
   the position of an evaluating subregion of the evaluating region in the evaluation object image, which evaluating subregion is associated with the maximum correlation value among the plurality of the correlation values having thus been calculated, is detected as the position of the signal area of the evaluating region in the evaluation object image.

6. A method as defined in claim 1 or 2 wherein each of the evaluating regions in the evaluation object image is divided into a plurality of evaluating subregions having approximately identical sizes, such that each of the plurality of the evaluating subregions is capable of containing one signal area, a test area is obtained from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and the detection of the position of the signal area of the evaluating region in the evaluation object image is performed in accordance with signal values within the plurality of the evaluating subregions of the evaluating region in the evaluation object image and signal values within the test area of the corresponding evaluating region in the reference image.

7. A method as defined in claim 6 wherein the sizes of the evaluating subregions and the size of the test area are altered in accordance with the sizes of the signal areas.

8. A method as defined in claim 6 wherein a calculation is made to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area of the corresponding evaluating region in the reference image, and the position of an evaluating subregion of the evaluating region in the evaluation object image, which evaluating subregion is associated with the maximum correlation value among the plurality of the correlation values having thus been calculated, is detected as the position of the signal area of the evaluating region in the evaluation object image.

9. An image evaluating apparatus, comprising:
i) input means for accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions,
ii) detection means for detecting the positions of the signal areas, which are located in all of the evaluating regions in the evaluation object image, in accordance with a reference image signal, which represents a reference image with respect to the pattern, and the evaluation object image signal, and
iii) evaluation means for performing evaluation of the evaluation object image in accordance with the results of the detection of the positions of the signal areas.

10. An apparatus as defined in claim 9 wherein the apparatus further comprises position matching means for performing position matching between the reference image and the evaluation object image, and the detection means is means for performing the detection of the positions of the signal areas after the position matching between the reference image and the evaluation object image has been performed by the position matching means.

11. An apparatus as defined in claim 9 or 10 wherein the detection means is means for:
dividing each of the evaluating regions in the evaluation object image and the corresponding evaluating region in the reference image respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and
performing the detection of the position of the signal area of the evaluating region in the evaluation object image in accordance with signal values within the corresponding evaluating subregions of the corresponding evaluating regions the evaluation object image and the reference image.

12. An apparatus as defined in claim 11 wherein the detection means alters the sizes of the evaluating subregions in accordance with the size of the signal area.

13. An apparatus as defined in claim 11 wherein the detection means is means for:
making a calculation to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and
detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

14. An apparatus as defined in claim 9 or 10 wherein the detection means is means for:
dividing each of the evaluating regions in the evaluation object image into a plurality of evaluating subregions having approximately identical sizes, such that each of the plurality of the evaluating subregions is capable of containing one signal area, obtaining a test area from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and
performing the detection of the position of the signal area of the evaluating region in the evaluation object image in accordance with signal values within the plurality of the evaluating subregions of the evaluating region in the evaluation object image and signal values within the test area of the corresponding evaluating region in the reference image.

15. An apparatus as defined in claim 14 wherein the detection means alters the sizes of the evaluating subregions and the size of the test area in accordance with the sizes of the signal areas.

16. An apparatus as defined in claim 14 wherein the detection means is means for:
   making a calculation to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area (of the corresponding evaluating region in the reference image, and
   detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

17. A computer program embodied in a computer readable medium for causing a computer to execute an image evaluating method, the computer program comprising the procedures for:
   i) accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions,
   ii) detecting the positions of the signal areas, which are located in all of the evaluating regions in the evaluation object image, in accordance with a reference image signal, which represents a reference image with respect to the pattern, and the evaluation object image signal, and
   iii) performing evaluation of the evaluation object image in accordance with the results of the detection of the positions of the signal areas.

18. A computer program as defined in claim 17 wherein the computer program further comprises the procedure for performing position matching between the reference image and the evaluation object image, and
   the procedure for detecting the positions of the signal areas is a procedure for performing the detection of the positions of the signal areas after the position matching between the reference image and the evaluation object image has been performed.

19. A computer program as defined in claim 17 or 18 wherein the procedure for detecting the positions of the signal areas comprises the procedures for:
   dividing each of the evaluating regions in the evaluation object image and the corresponding evaluating region in the reference image respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and
   performing the detection of the position of the signal area of the evaluating region in the evaluation object image in accordance with signal values within the corresponding evaluating subregions of the corresponding evaluating regions in the evaluation object image and the reference image.

20. A computer program as defined in claim 19 wherein the procedure for dividing each of the evaluating regions in the evaluation object image and the corresponding evaluating region in the reference image respectively into the plurality of the evaluating subregions comprises a procedure for altering the sizes of the evaluating subregions in accordance with the size of the signal area.

21. A computer program as defined in claim 19 wherein the procedure for detecting the positions of the signal areas comprises the procedures for:
   making a calculation to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and
   detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

22. A computer program as defined in claim 17 or 18 wherein the procedure for detecting the positions of the signal areas comprises the procedures for:
   dividing each of the evaluating regions in the evaluation object image into a plurality of evaluating subregions having approximately identical sizes, such that each of the plurality of the evaluating subregions is capable of containing one signal area,
   obtaining a test area from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and
   performing the detection of the position of the signal area of the evaluating region in the evaluation object image in accordance with signal values within the plurality of the evaluating subregions of the evaluating region in the evaluation object image and signal values within the test area of the corresponding evaluating region in the reference image.

23. A computer program as defined in claim 22 wherein the procedure for dividing each of the evaluating regions in the evaluation object image into the plurality of the evaluating subregions comprises a procedure for altering the sizes of the evaluating subregions in accordance with the size of the signal area, and
   the procedure for obtaining the test area comprises a procedure for altering the size of the test area in accordance with the size of the signal area.

24. A computer program as defined in claim 22 wherein the procedure for detecting the positions of the signal areas comprises the procedures for:
   making a calculation to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area of the corresponding evaluating region in the reference image, and detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

25. A computer readable recording medium, on which a computer program for causing a computer to execute an image evaluating method has been recorded and from which the computer is capable of reading the computer program, wherein the computer program comprises the procedures for:

i) accepting an input of an evaluation object image signal representing an evaluation object image with respect to a pattern composed of a plurality of evaluating regions, in each of which at least one signal area is located at a predetermined position, the evaluating regions having been set such that a size and contrast of the signal area vary by stages for different evaluating regions, ii) detecting the positions of the signal areas, which are located in all of the evaluating regions in the evaluation object image, in accordance with a reference image signal, which represents a reference image with respect to the pattern, and the evaluation object image signal, and iii) performing evaluation of the evaluation object image in accordance with the results of the detection of the positions of the signal areas.

26. A computer readable recording medium as defined in claim 25 wherein the computer program further comprises the procedure for performing position matching between the reference image and the evaluation object image, and the procedure for detecting the positions of the signal areas is a procedure for performing the detection of the positions of the signal areas after the position matching between the reference image and the evaluation object image has been performed.

27. A computer readable recording medium as defined in claim 25 or 26 wherein the procedure for detecting the positions of the signal areas comprises the procedures for:

dividing each of the evaluating regions in the evaluation object image and the corresponding evaluating region in the reference image respectively into a plurality of evaluating subregions, such that each of the plurality of the evaluating subregions of the evaluating region in the evaluation object image corresponds to one of the plurality of the evaluating subregions of the evaluating region in the reference image, which evaluating region corresponds to the evaluating region in the evaluation object image, and performing the detection of the position of the signal area of the evaluating region in the evaluation object image in accordance with signal values within the corresponding evaluating subregions of the corresponding evaluating regions in the evaluation object image and the reference image.

28. A computer readable recording medium as defined in claim 27 wherein the procedure for dividing each of the evaluating regions in the evaluation object image and the corresponding evaluating region in the reference image respectively into the plurality of the evaluating subregions comprises a procedure for altering the sizes of the evaluating subregions in accordance with the size of the signal area.

29. A computer readable recording medium as defined in claim 27 wherein the procedure for detecting the positions of the signal areas comprises the procedures for:

making a calculation to find a correlation value between the corresponding evaluating subregions in the evaluation object image and the reference image, a plurality of the correlation values being calculated with respect to the plurality of sets of the corresponding evaluating subregions of the corresponding evaluating regions in the evaluation object image and the reference image, and detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

30. A computer readable recording medium as defined in claim 25 or 26 wherein the procedure for detecting the positions of the signal areas comprises the procedures for dividing each of the evaluating regions in the evaluation object image into a plurality of evaluating subregions having approximately identical sizes, such that each of the plurality of the evaluating subregions is capable of containing one signal area, obtaining a test area from the evaluating region in the reference image, which evaluating region corresponds to the evaluating region in the evaluation object image, the test area having a size, which corresponds to the sizes of the evaluating subregions of the evaluating region in the evaluation object image, and containing one signal area, and performing the detection of the position of the signal area of the evaluating region in the evaluation object image in accordance with signal values within the plurality of the evaluating subregions of the evaluating region in the evaluation object image and signal values within the test area of the corresponding evaluating region in the reference image.

31. A computer readable recording medium as defined in claim 30 wherein the procedure for dividing each of the evaluating regions in the evaluation object image into the plurality of the evaluating subregions comprises a procedure for altering the sizes of the evaluating subregions in accordance with the size of the signal area, and the procedure for obtaining the test area comprises a procedure for altering the size of the test area in accordance with the size of the signal area.

32. A computer readable recording medium as defined in claim 30 wherein the procedure for detecting the positions of the signal areas comprises the procedures for:

making a calculation to find a correlation value between each of the evaluating subregions of the evaluating region in the evaluation object image and the test area of the corresponding evaluating region in the reference image, a plurality of the correlation values being calculated with respect to the plurality of sets of the evaluating subregions of the evaluating region in the evaluation object image and the test area of the corresponding evaluating region in the reference image, and detecting the position of an evaluating subregion of the evaluating region in the evaluation object image, which evaluating subregion is associated with the maximum correlation value among the plurality of the correlation values having thus been calculated, as the position of the signal area of the evaluating region in the evaluation object image.

* * * * *